US011413907B2

(12) United States Patent
Hirsch et al.

(10) Patent No.: US 11,413,907 B2
(45) Date of Patent: Aug. 16, 2022

(54) TIRE WITH SHALLOW GROOVE-BASED TREAD WEAR INDICATOR

(71) Applicant: The Goodyear Tire & Rubber Company, Akron, OH (US)

(72) Inventors: Thomas Michael Hirsch, Rheinduerkheim (DE); Philipp Weber, Offenbach am Main (DE); Florian Roth, Buedingen (DE); Suphaphan Atsawasuwan, Offenbach am Main (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 103 days.

(21) Appl. No.: 17/072,352

(22) Filed: Oct. 16, 2020

(65) Prior Publication Data

US 2022/0118801 A1     Apr. 21, 2022

(51) Int. Cl.
*B60C 11/24* (2006.01)
*B60C 11/03* (2006.01)

(52) U.S. Cl.
CPC .......... *B60C 11/24* (2013.01); *B60C 11/0302* (2013.01); *B60C 11/0304* (2013.01); *B60C 2011/0351* (2013.01)

(58) Field of Classification Search
CPC ...................................... B60C 11/24
See application file for complete search history.

(56) References Cited

U.S. PATENT DOCUMENTS

| | | |
|---|---|---|
| 2,102,784 A | 12/1937 | Bridges |
| 2,706,509 A | 4/1955 | White |
| 3,653,422 A | 4/1972 | French |
| 3,814,160 A | 6/1974 | Creasey |
| 4,154,564 A | 5/1979 | French |
| 4,198,774 A | 4/1980 | Roberts et al. |
| 4,226,274 A | 10/1980 | Awaya et al. |
| 4,353,402 A * | 10/1982 | Burche ............... B60C 11/1369 152/DIG. 3 |

(Continued)

FOREIGN PATENT DOCUMENTS

| | | |
|---|---|---|
| DE | 3627832 | 2/1988 |
| JP | S5925684 | 7/1984 |

(Continued)

OTHER PUBLICATIONS

Machine translation for Korea 2007-0097926 (Year: 2022).*
Extended European search report received by applicant Mar. 11, 2022.

*Primary Examiner* — Steven D Maki
(74) *Attorney, Agent, or Firm* — Edward T. Kennedy

(57) ABSTRACT

A tire including a tread wear indicator is provided. The tire includes a pair of sidewalls, in which each sidewall extends from a respective bead area to a tread. The tread includes a plurality of main circumferential grooves, in which the main circumferential grooves are disposed in and proximate an axial center area of the tread. At least one shallow groove is formed in the tread, and each shallow groove includes a depth relative to the surface of the tread that is less than a depth of each of the main circumferential grooves. A primary tread wear indicator is disposed in at least one of the main circumferential grooves, and a secondary tread wear indicator is disposed in the shallow groove.

4 Claims, 7 Drawing Sheets

(56) References Cited

U.S. PATENT DOCUMENTS

| | | |
|---|---|---|
| 4,823,856 A | 4/1989 | Roberts |
| 5,980,668 A | 11/1999 | Slingluff |
| 6,523,586 B1 | 2/2003 | Eromaki et al. |
| 6,883,567 B2 | 4/2005 | Shimura |
| 6,994,133 B2 | 2/2006 | Willard, Jr. et al. |
| 7,011,126 B2 | 3/2006 | Heinen |
| 7,140,410 B2 | 11/2006 | Helt et al. |
| 7,670,123 B2 | 3/2010 | Cuny et al. |
| 7,743,807 B2 | 6/2010 | Palombo |
| 7,784,508 B2 | 8/2010 | Kemp et al. |
| 8,162,014 B2 | 4/2012 | Mosko et al. |
| 8,256,479 B2 | 9/2012 | Nakano |
| 8,403,012 B2 | 3/2013 | Harvey |
| 8,584,721 B2 | 11/2013 | Fujii et al. |
| 8,695,655 B2 | 4/2014 | Cuny et al. |
| 8,857,252 B2 | 10/2014 | Lamb et al. |
| D717,727 S | 11/2014 | Parr et al. |
| 8,960,246 B2 | 2/2015 | Shimomura et al. |
| 8,985,166 B2 | 3/2015 | Sato |
| D736,698 S | 8/2015 | Lundgren |
| D740,218 S | 10/2015 | Raatikainen et al. |
| D751,497 S | 3/2016 | Kidney |
| 9,355,346 B2 | 5/2016 | Butz |
| D758,297 S | 6/2016 | Kidney |
| D765,589 S | 9/2016 | Hara |
| 2005/0081971 A1 | 4/2005 | Heinen |
| 2005/0269003 A1* | 12/2005 | Fujii ................... B60C 11/24 |
| | | 73/146 |
| 2006/0016538 A1* | 1/2006 | Miyazaki ............ B60C 11/1369 |
| | | 152/209.22 |
| 2006/0037683 A1 | 2/2006 | Cuny et al. |
| 2006/0213594 A1* | 9/2006 | Kemp ................... B60C 11/24 |
| | | 152/154.2 |
| 2009/0095388 A1 | 4/2009 | Cuny et al. |
| 2011/0079333 A1 | 4/2011 | Collette et al. |
| 2011/0126949 A1 | 6/2011 | Cuny et al. |
| 2012/0103484 A1 | 5/2012 | Ohashi |
| 2013/0160913 A1 | 6/2013 | Lonkar et al. |
| 2013/0186531 A1 | 7/2013 | O'Brien |
| 2013/0206291 A1 | 8/2013 | Emorine et al. |
| 2014/0246134 A1* | 9/2014 | Hironaka ............... B60C 11/24 |
| | | 152/154.2 |
| 2014/0365069 A1 | 12/2014 | Orlewski |
| 2015/0328937 A1 | 11/2015 | Girard et al. |
| 2015/0343850 A1 | 12/2015 | Dorfi et al. |
| 2015/0343852 A1* | 12/2015 | Joza ................... B60C 11/1307 |
| | | 152/154.2 |
| 2016/0221400 A1* | 8/2016 | Schimmoeller ....... B60C 13/001 |

FOREIGN PATENT DOCUMENTS

| | | | |
|---|---|---|---|
| JP | S61202902 A | | 9/1986 |
| JP | 2017024714 A | | 2/2017 |
| KR | 2007-0097926 A | * | 10/2007 |

* cited by examiner

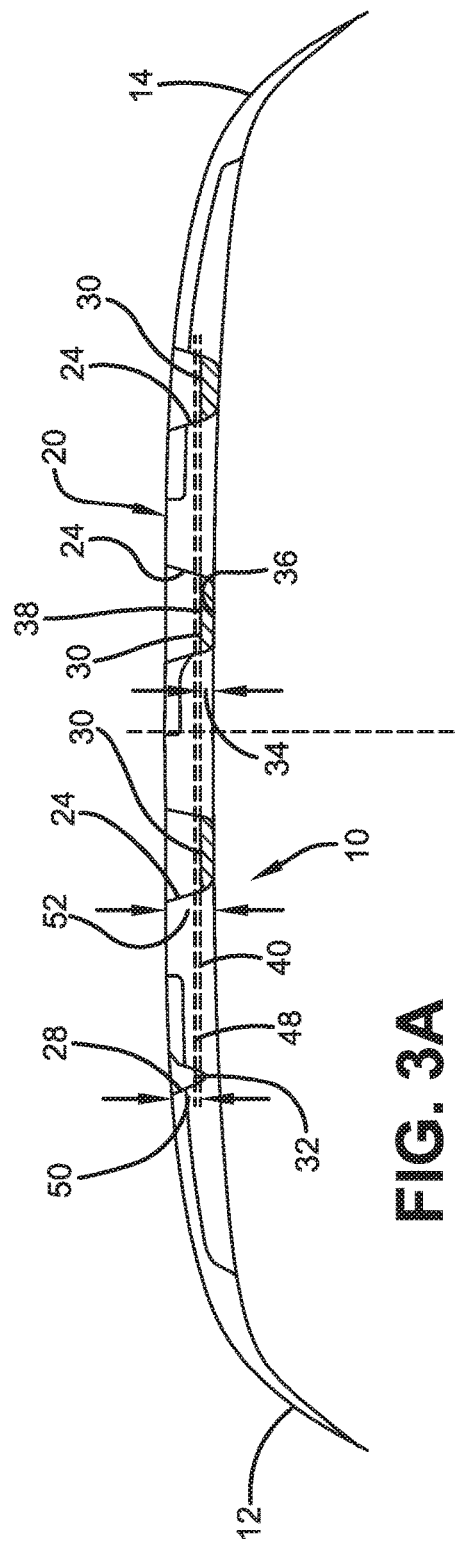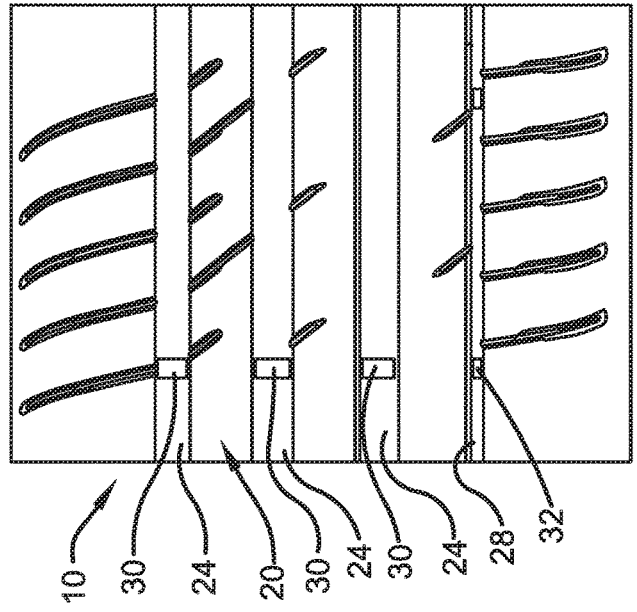

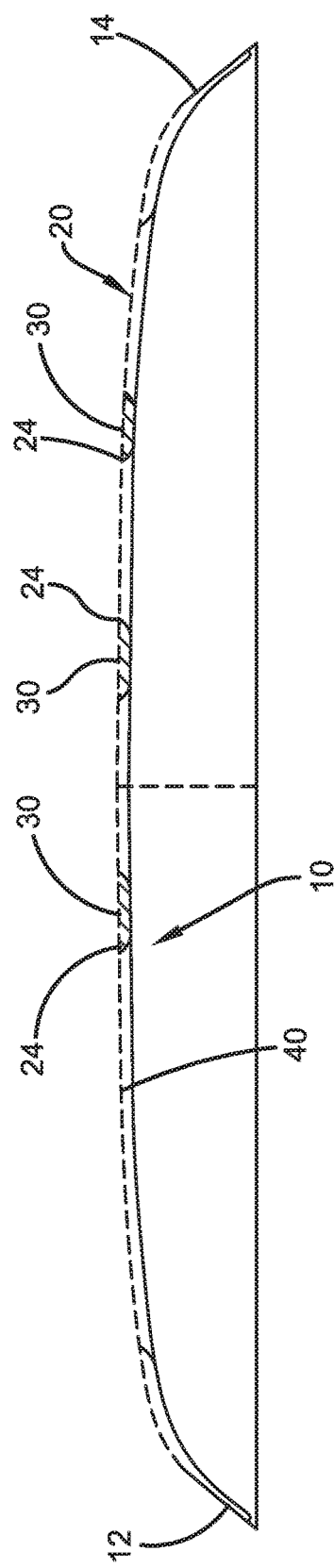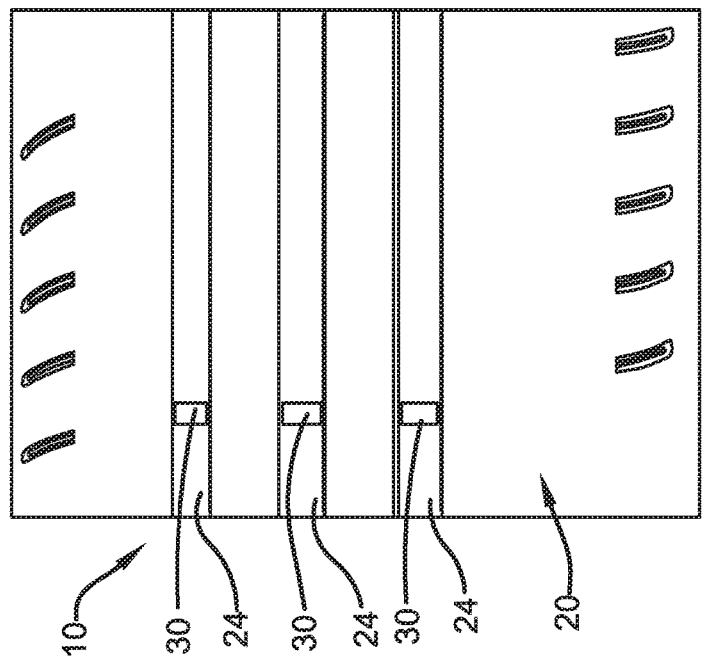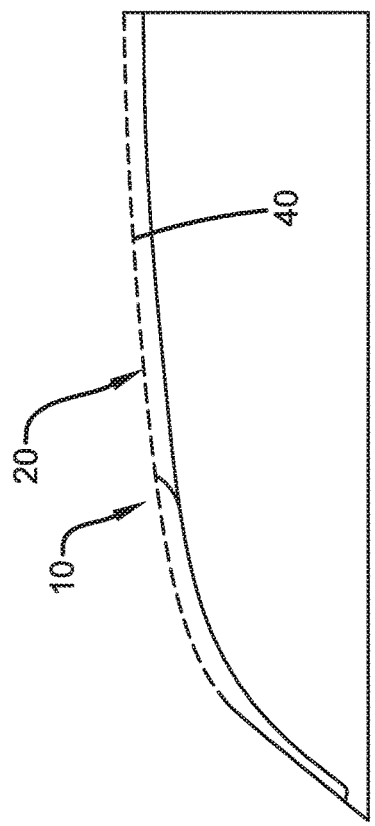
FIG. 5A
FIG. 5B
FIG. 5C

TIRE WITH SHALLOW GROOVE-BASED TREAD WEAR INDICATOR

FIELD OF THE INVENTION

The invention relates to pneumatic tires and to tread wear indicators for such tires. More particularly, the invention is directed to a tire that includes a tread wear indicator disposed in a shallow groove formed in the tread of the tire.

BACKGROUND OF THE INVENTION

In the pneumatic tire art, it is known that, as the tread of the tire wears away, the ability to maintain traction may diminish on wet or snow-covered roads. Accordingly, once the tread is worn beyond a certain tread depth, the tire should be replaced to maintain adequate traction.

In order to inform a vehicle user when a tire may need to be replaced due to tread wear, tread wear indicators have been developed. Some tread wear indicators involve providing features formed in the base of the main circumferential grooves of the tire tread. When the tread wears down to the same level as the indicators, the tire should be replaced. However, it may be difficult for a user to see an indicator that is formed in the base of the main circumferential grooves of the tread.

Other indicators have been developed, which are located in the tread or on the surface of the tread of the tires. However, many such prior art indicators have undesirably interfered with tread performance and/or have been difficult for a user to see.

Still other indicators have been developed that involve sensors which measure tire wear and provide an alert or signal to the user as to the wear state of the tire. While such sensors are suitable for their intended purpose, they add to the cost of the tire.

As a result, there is a need in the art for a pneumatic tire with a tread wear indicator that is easy for a user to see, does not interfere with tire performance, and is economical to form and use.

SUMMARY OF THE INVENTION

According to an exemplary embodiment of the invention, a tire includes a tread wear indicator. The tire includes a pair of sidewalls, in which each sidewall extends from a respective bead area to a tread. The tread includes a plurality of main circumferential grooves, in which the main circumferential grooves are disposed in and proximate an axial center area of the tread. At least one shallow groove is formed in the tread, in which each shallow groove includes a depth relative to the surface of the tread that is less than a depth of each of the main circumferential grooves. A primary tread wear indicator is disposed in at least one of the main circumferential grooves, and a secondary tread wear indicator is disposed in the at least one shallow groove.

Definitions

The following definitions are applicable to the present invention.

"Axial" and "axially" mean lines or directions that are parallel to the axis of rotation of the tire.

"Equatorial plane" means the plane perpendicular to the axis of rotation of the tire and passing through the center of the tire tread.

"Groove" means an elongated void area in a tread that may extend circumferentially or laterally about the tread in a straight curved, or zigzag manner.

"Inner" means toward the inside of the tire.

"Lateral" and "laterally" are used to indicate axial directions across the tread of the tire.

"Outer" means toward the outside of the tire.

"Radial" and "radially" are used to mean directions radially toward or away from the axis of rotation of the tire.

"Tread" means a molded rubber component which includes that portion of the tire that comes into contact with the road when the tire is normally inflated and under normal load.

BRIEF DESCRIPTION OF THE DRAWINGS

The invention will be described by way of example and with reference to the accompanying drawings, in which:

FIG. 3A is a cross-sectional view of a portion of the tire including a tread wear indicator shown in FIG. 2, in a first wear state;

FIG. 3B is an enlarged fragmentary view of the portion of the tire including a tread wear indicator shown in FIG. 3A;

FIG. 3C is a schematic plan view of a portion of the tire including a tread wear indicator shown in FIG. 3A;

FIG. 5A is a cross-sectional view of a portion of the tire including a tread wear indicator shown in FIG. 2, in a third wear state;

FIG. 5B is an enlarged fragmentary view of the portion of the tire including a tread wear indicator shown in FIG. 5A;

FIG. 5C is a schematic plan view of a portion of the tire including a tread wear indicator shown in FIG. 5A;

Similar numerals refer to similar parts throughout the drawings.

DETAILED DESCRIPTION OF THE INVENTION

Figure 1:
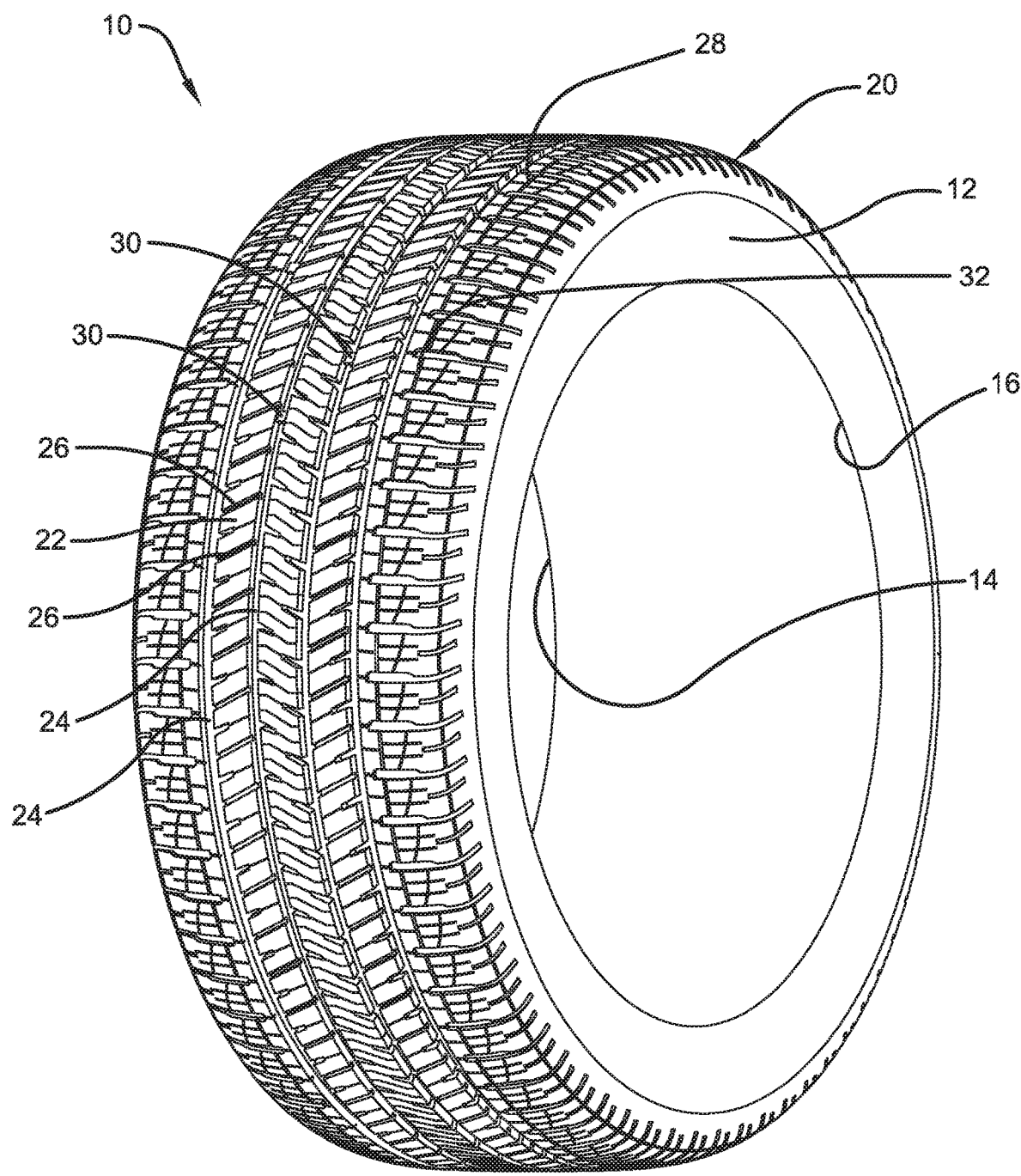
FIG. 1 is a perspective view of a first exemplary embodiment of a tire including a tread wear indicator of the present invention.
Figure 2:
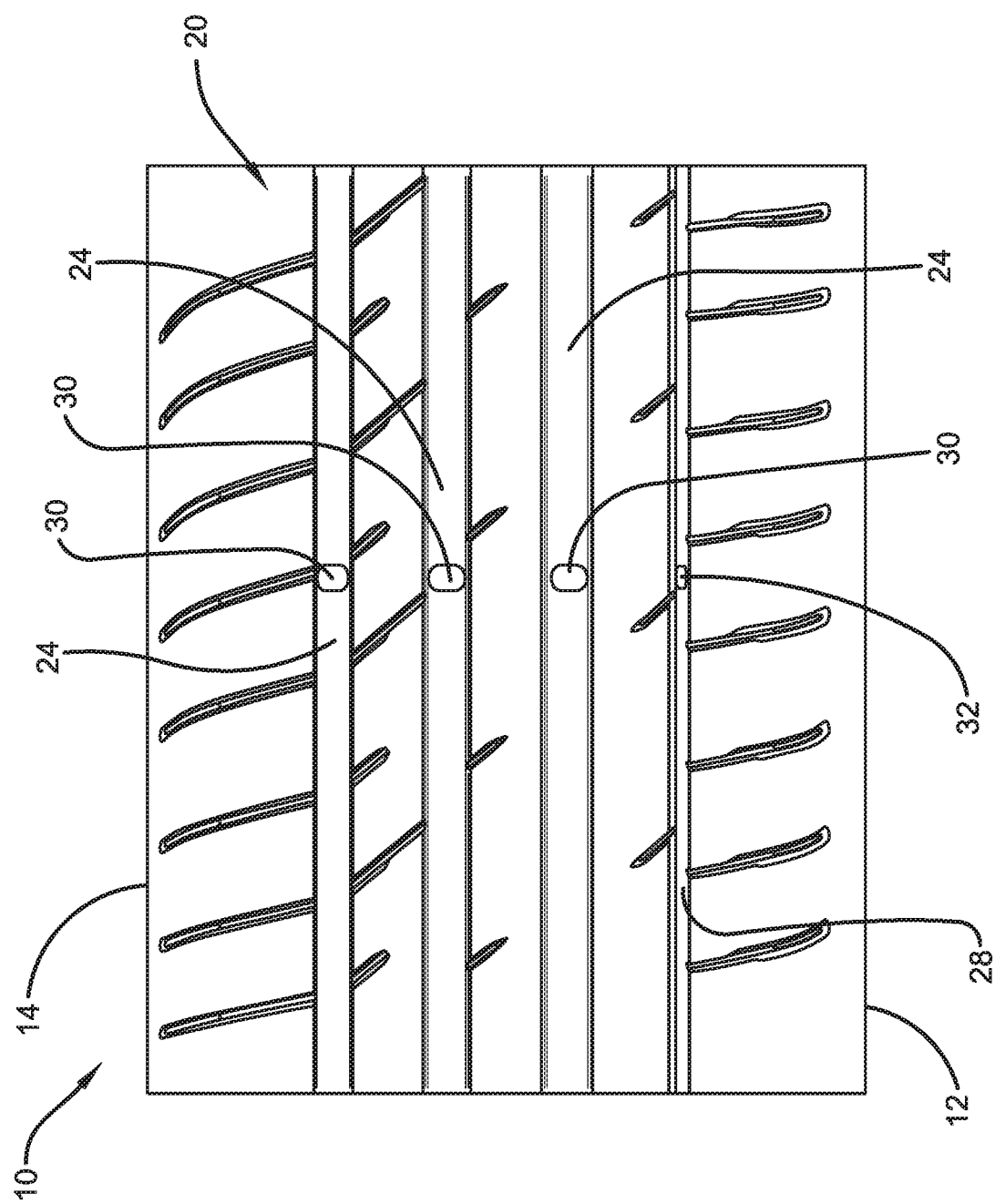
FIG. 2 is a schematic plan view of a portion of the tire including a tread wear indicator shown in FIG. 1.

Turning to FIGS. 1 through 5C, a first exemplary embodiment of a tire including a tread wear indicator of the present invention is indicated at 10. With particular reference to FIGS. 1 through 3, the tire 10 includes a pair of sidewalls 12 and 14 extending from respective bead areas 16 (only one shown) to a tread 20. When the tire 10 is mounted on a vehicle, one of the sidewalls 12 preferably is an outboard sidewall, and the other sidewall 14 is an inboard sidewall. The tread 20 includes a plurality of tread elements 22 that are defined by main circumferential grooves 24 and lateral grooves 26.

The main circumferential grooves 24 typically are disposed in and proximate an axial or lateral center area of the tread 20. The tread 20 also includes at least one shallow groove 28. Typically, the shallow groove 28 is disposed axially or laterally between the main circumferential grooves 24 and an adjacent one of the sidewalls 12 and 14. Each shallow groove 28 includes a depth 50 relative to the surface of the tread 20 that is less than a depth 52 of the main circumferential grooves 24, thereby causing the shallow groove to be shallower than the main circumferential grooves. It is to be understood that any tread configuration may be employed with the present invention.

A main or primary tread wear indicator 30 is disposed in one or more of the main circumferential grooves 24. The main tread wear indicator 30 will be described in greater detail below. The tire 10 of the invention includes a shallow groove-based or secondary tread wear indicator 32 disposed in at least one of the shallow grooves 28. The shallow groove-based tread wear indicator 32 will also be described in greater detail below. The tire 10 preferably includes more than one main tread wear indicator 30 disposed about the circumference of the tread 20 in one or more of the main circumferential grooves 24. The tire 10 also preferably includes more than one shallow groove-based tread wear indicator 32 disposed about the circumference of the tread 20 in one or more of the shallow grooves 28.

Turning to FIGS. 3A through 3C, the tire 10 is shown in a first wear state, which is a new or relatively unworn state. A respective main tread wear indicator 30 is formed in each of the main circumferential grooves 24. Each main tread wear indicator 30 is formed with a radial height 34 extending radially outwardly from a base 36 of the respective main circumferential groove 24 to a radially outer surface 38 of the main indicator. The radially outer surface 38 of each main tread wear indicator 30 radially aligns along a line 40.

Each shallow groove-based indicator 32 is formed in the shallow groove 28. Each shallow groove-based indicator 32 is formed with a radial height 42 extending radially outwardly from a base 44 of the shallow groove 28 to a radially outer surface 46 of the shallow groove-based indicator. The radially outer surface 46 of each shallow groove-based tread wear indicator 32 radially aligns with a line 48. The base 44 of the shallow groove 28, and thus the base of the shallow groove indicator 32, is in radial alignment with the radially outer surface 38 of the main indicators 30, as indicated by the line 40.

When the tread 20 wears down to the level of the line 40, the tire 10 should be replaced. However, it may be difficult for a user to see the main indicators 30 when the tire 10 is mounted on a vehicle, as they are formed in the base 36 of the main circumferential grooves 24. Because the shallow groove 28 preferably is disposed proximate the outboard sidewall 12, it is easier for a user to see the shallow groove-based indicators 32 than the main indicators 30 when the tire 10 is mounted on a vehicle. In addition, it is easy for a user to check an early wear state of the tire 10 by referring to the shallow groove-based indicator 32 before the tread 20 wears down to the level of the main indicators 30, at line 40.

Figure 4A:
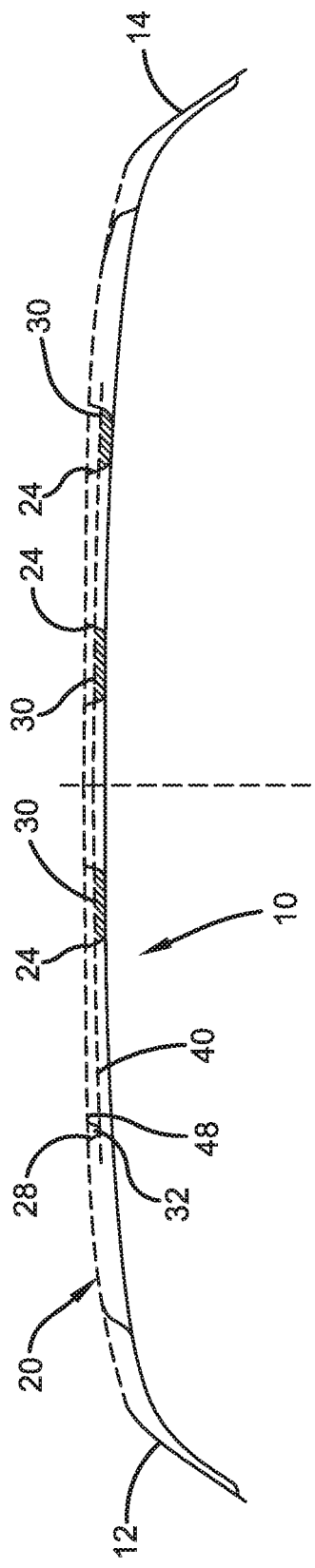
FIG. 4A is a cross-sectional view of a portion of the tire including a tread wear indicator shown in FIG. 2, in a second wear state.
Figure 4C:
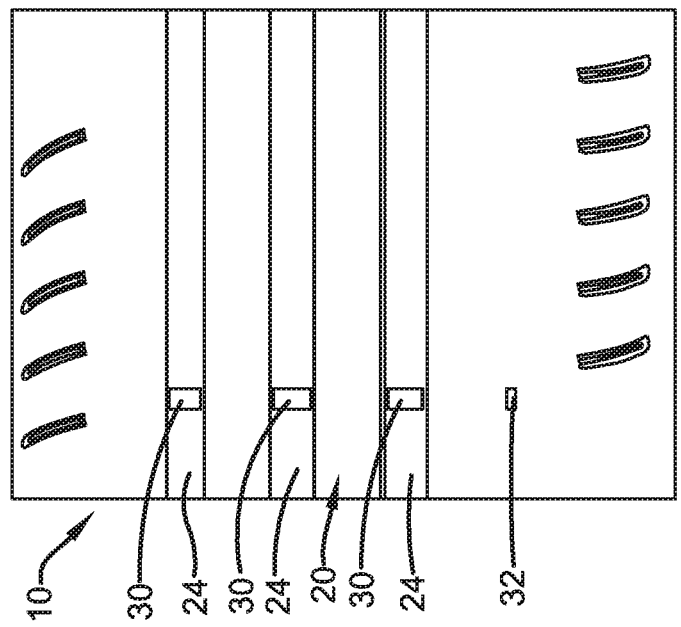
FIG. 4C is a schematic plan view of a portion of the tire including a tread wear indicator shown in FIG. 4A.
Figure 4B:
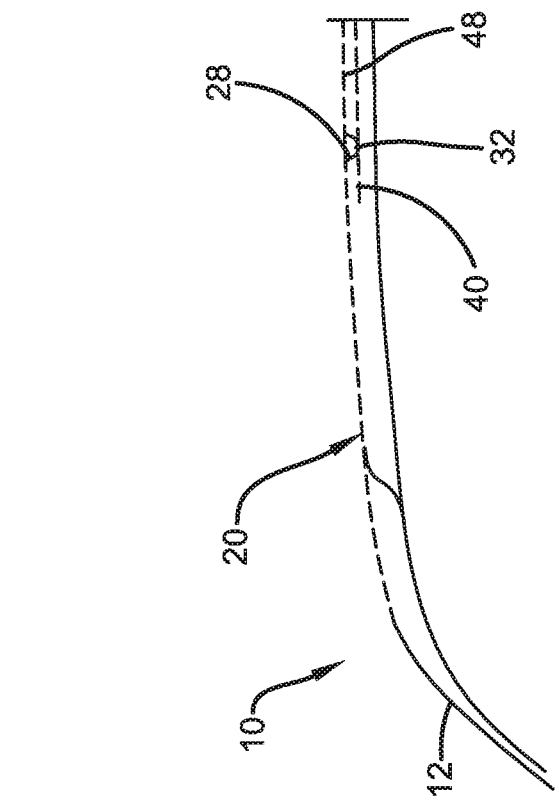
FIG. 4B is an enlarged fragmentary view of the portion of the tire including a tread wear indicator shown in FIG. 4A.

The tire 10 is shown in a partially worn state in FIGS. 4A through 4C. In this state, the tread 20 has worn down to the radially outer surface 46 of each shallow groove-based tread wear indicator 32, or the line 48, which is radially outwardly of the line 40. Because the tread 20 has not yet worn down to the base 44 of the shallow groove 28 and line 40, the shallow groove indicator 32 is visible. Because the shallow groove 28 is disposed proximate the outboard sidewall 12, it is easier for a user to see the shallow groove-based indicators 32 than the main indicators 30 when the tire 10 is mounted on a vehicle. In addition, it is easy for a user to continue to check an early wear state of the tire 10 by referring to the shallow groove-based indicator 32 before the tread 20 wears down to the level of the main indicators 30, at line 40.

Turning to FIGS. 5A through 5C, the tire 10 is shown in a more fully worn state. In this state, the tread 20 has worn down to the level of the main indicators 30, at line 40. At this point, the shallow groove indicator 32 no longer visible and the main indicators 30 are then referred to. Preferably, when the tread 20 has worn down to the same level as the main indicators 30, the tire 10 should be replaced.

In this manner, the tire 10 includes shallow groove-based indicators 32, which are easier for a user to see than the main indicators 30 when the tire is mounted on a vehicle. In addition, the tire 10 with the shallow groove-based indicators 32 enables the user to check an early wear state of the tire by referring to the shallow groove-based indicators before the tread 20 wears down to the level of the main indicators 30.

Turning to FIGS. 6A through 8, a second exemplary embodiment of a tire including a tread wear indicator of the present invention is indicated at 60. The second embodiment of the tire 60 is similar in construction and operation to the first embodiment of the tire 10, with the exception of certain features, as will be described in detail below.

The second embodiment of the tire 60 also includes the tread 20, which is formed with the main circumferential grooves 24 and at least one shallow groove 64. Each main or primary tread wear indicator 30 is disposed in one or more of the main circumferential grooves 24, and the radially outer surface 38 of each main tread wear indicator radially aligns along the line 40. The second embodiment of the tire 60 includes a shallow groove-based or secondary tread wear indicator 62 disposed in at least one of the shallow grooves 64. In the second embodiment of the tire 60, the shallow groove 64 is smaller or shallower than the shallow groove 28 of the first embodiment of the tire 10.

Figure 6A:
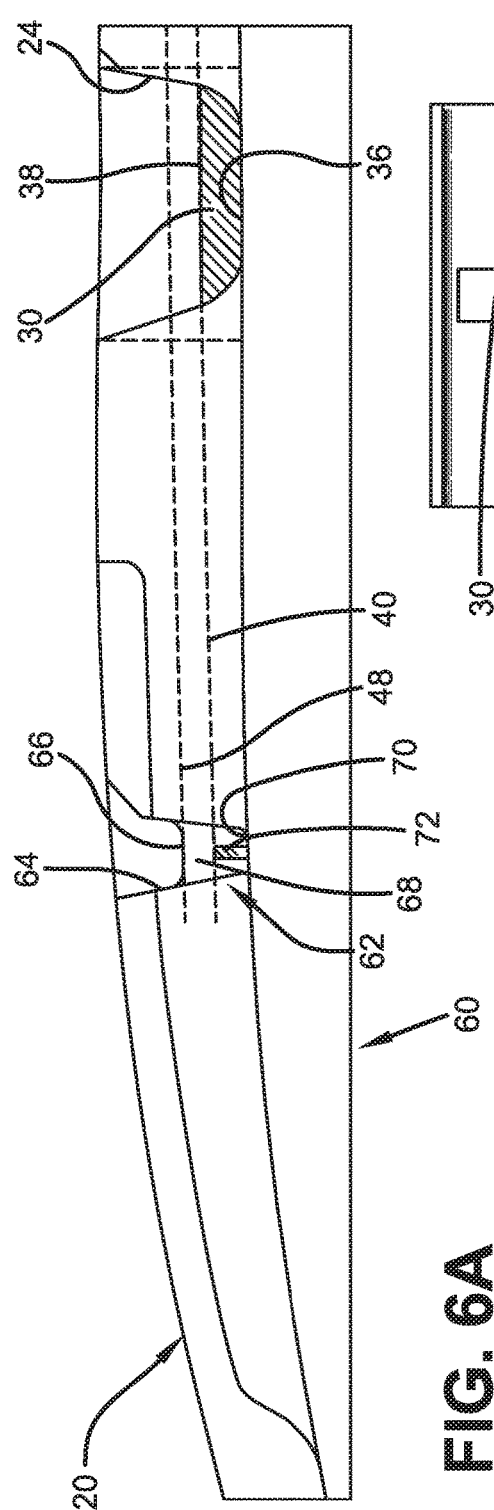
FIG. 6A is a cross-sectional fragmentary view of a portion of a second exemplary embodiment of a tire including a tread wear indicator of the present invention, in a first wear state.
Figure 6B:
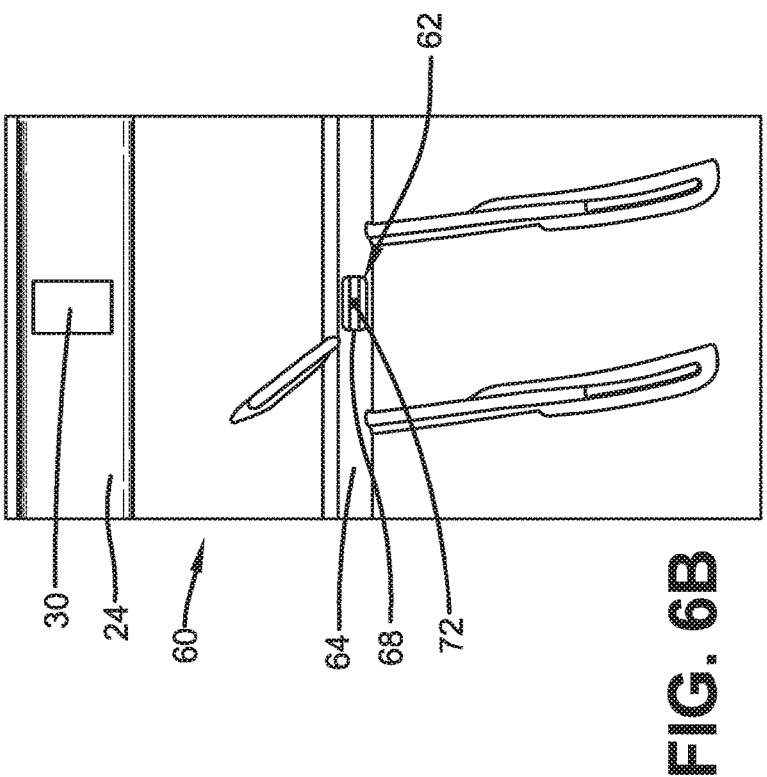
FIG. 6B is a schematic plan view of a portion of the tire including a tread wear indicator shown in FIG. 6A.

As shown in FIGS. 6A and 6B, the tire 60 is shown in a first wear state, which is a new or relatively unworn state. The shallow groove 64 includes a base 66, and the shallow groove-based indicator 62 includes a pocket 68. The pocket 68 extends radially inwardly from the base 66 of the shallow groove 64 to a radial depth 70 that is equal to or radially aligned with the base 36 of the main circumferential grooves 24. In the pocket 68, a feature or hump 72 is formed, which extends radially outwardly to a distance in radial alignment with the radially outer surface 38 of each main tread wear indicator 30 and the line 40. In this manner, the feature or hump 72 of the shallow groove-based indicator 62 is in radial alignment with the radially outer surface 38 of the main indicators 30, as indicated by the line 40.

When the tread 20 wears down to the level of the line 40, the tire 60 should be replaced. However, it may be difficult for a user to see the main indicators 30 when the tire 60 is mounted on a vehicle, as they are formed in the base 36 of the main circumferential grooves 24. Because the shallow groove 64 preferably is disposed proximate the outboard sidewall 12, it is easier for a user to see the shallow groove-based indicators 62 than the main indicators 30 when the tire 60 is mounted on a vehicle. In addition, it may be easy for a user to check an early wear state of the tire 60 by referring to the shallow groove-based indicator 62 before the tread 20 wears down to the level of the main indicators 30, as the base 66 of the shallow groove 64 and the feature or hump 72 is visible.

Figure 7:
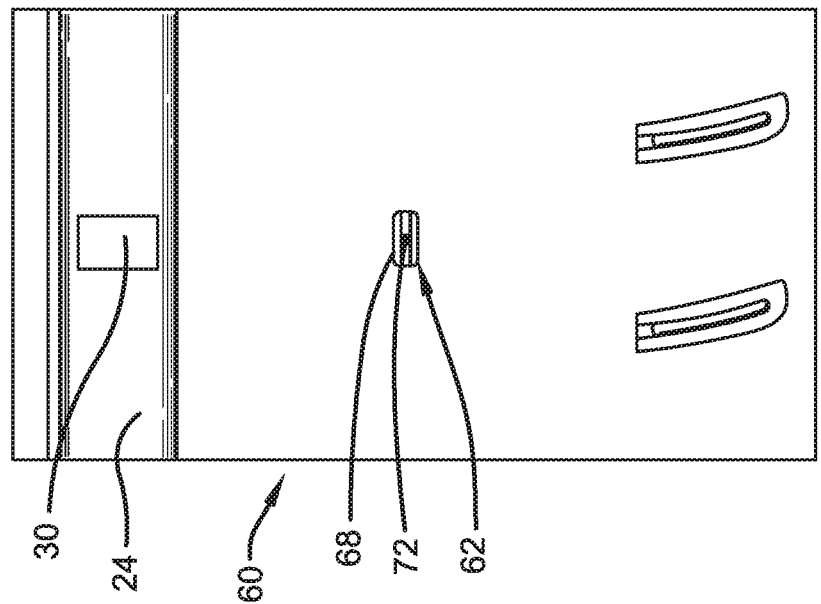
FIG. 7 is a schematic plan view of a portion of the tire including a tread wear indicator shown in FIG. 6B, in a second wear state.

The tire 60 is shown in a partially worn state in FIG. 7. In this state, the tread 20 has worn down to the radially outer surface 66 of each shallow groove-based tread wear indicator 62, at the line 48, which is radially outwardly of the line 40. Because the tread 20 has not yet worn down to the line 40, the shallow groove-based tread wear indicator 62 and the feature or hump 72 are visible. Because the shallow groove 64 is disposed proximate the outboard sidewall 12, it is easier for a user to see the shallow groove-based indicators 62 than the main indicators 30 when the tire 60 is mounted on a vehicle. In addition, it may be easy for a user to check an early wear state of the tire 60 by referring to the shallow groove-based indicator 62 before the tread 20 wears down to the level of the main indicators 30, as the feature or hump 72 is visible.

Figure 8:
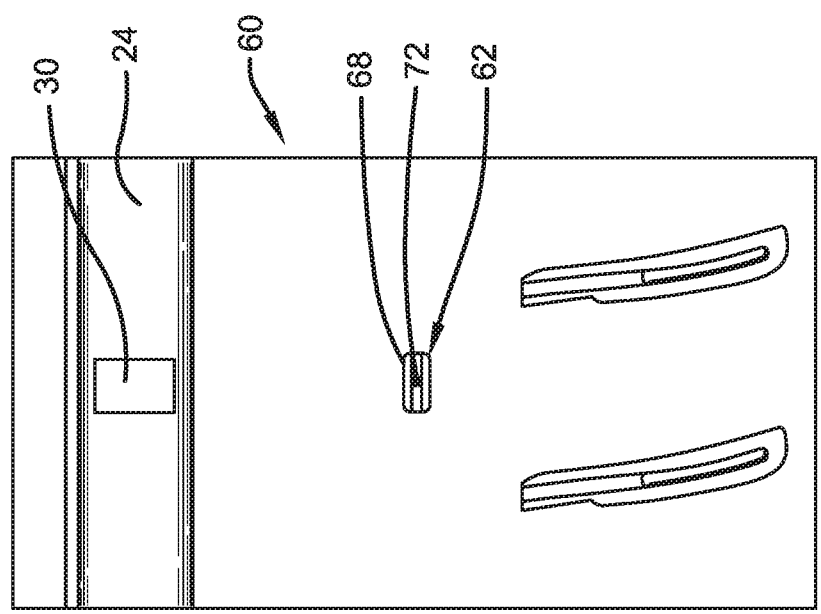
FIG. 8 is a schematic plan view of a portion of the tire including a tread wear indicator shown in FIG. 6B, in a third wear state.

Turning to FIG. 8, the tire 60 is shown in a more fully worn state. In this state, the tread 20 has worn down to the level of the main indicators 30, or line 40. At this point, the shallow groove 64 is no longer visible and the main indicators 30 may be referred to. In addition, because the feature or hump 72 of the shallow groove-based indicator 62 is in radial alignment with the radially outer surface 38 of the main indicators 30, the feature or hump is visible. Preferably, when the tread 20 has worn down to this level, the tire 10 should be replaced.

In this manner, the tire 60 includes shallow groove-based indicators 62, which are easier for a user to see than the main indicators 30 when the tire is mounted on a vehicle. In addition, the tire 60 with the shallow groove-based indicators 62 enables the user to check an early wear state of the tire by referring to the shallow groove-based indicators before the tread 20 wears down to the level of the main indicators 30, as the base 66 of the shallow groove 64 and the feature or hump 72 is visible.

The present invention also includes a method of forming a shallow groove-based tread wear indicator 32, 62 in a tire 10, 60 and a method of using a shallow groove-based tread wear indicator in a tire. Each method includes steps in accordance with the description that is presented above and shown in FIGS. 1 through 8.

It is to be understood that the structure of the above-described tire including a shallow groove-based tread wear indicator may be altered or rearranged, or components or steps known to those skilled in the art omitted or added, without affecting the overall concept or operation of the invention. The invention has been described with reference to preferred embodiments. Potential modifications and alterations will occur to others upon a reading and understanding of this description. It is to be understood that all such modifications and alterations are included in the scope of the invention as set forth in the appended claims, or the equivalents thereof.

What is claimed is:

1. A tire including a tread wear indicator, comprising:
a pair of sidewalls, each sidewall extending from a respective bead area to a tread;
the tread including a plurality of main circumferential grooves, the main circumferential grooves being disposed in and proximate an axial center area of the tread;
at least one shallow groove being formed in the tread, each shallow groove including a depth relative to the surface of the tread being less than a depth of each of the main circumferential grooves, wherein the at least one shallow groove includes a base;
a primary tread wear indicator being disposed in at least one of the main circumferential grooves, wherein each primary tread wear indicator is formed with a radial height extending radially outwardly from a base of a respective one of the plurality of main circumferential grooves to a radially outer surface of the respective primary indicator; and
a secondary tread wear indicator being disposed in at least one of the at least one shallow groove, wherein the secondary tread wear indicator includes a pocket, and the pocket extends radially inwardly from the base of the at least one shallow groove to a radial depth that is in radial alignment with the base of a respective one of the plurality of main circumferential grooves.

2. The tire including a tread wear indicator of claim 1, wherein the at least one shallow groove is disposed axially between the plurality of the main circumferential grooves and an adjacent one of the sidewalls.

3. The tire including a tread wear indicator of claim 1, wherein the tire includes more than one secondary tread wear indicator disposed about a circumference of the tread.

4. The tire including a tread wear indicator of claim 1, wherein a feature is formed in the pocket, the feature extending radially outwardly to a distance in radial alignment with the radially outer surface of each primary tread wear indicator.

* * * * *